United States Patent [19]

Yoshikawa

[11] Patent Number: 4,623,806

[45] Date of Patent: Nov. 18, 1986

[54] LINEAR MOTOR

[75] Inventor: Junichi Yoshikawa, Tokyo, Japan

[73] Assignee: Canon Kabushiki Kaisha, Tokyo, Japan

[21] Appl. No.: 770,353

[22] Filed: Aug. 27, 1985

Related U.S. Application Data

[63] Continuation of Ser. No. 550,017, Nov. 8, 1983, abandoned.

[30] Foreign Application Priority Data

Nov. 10, 1982 [JP] Japan ................... 57-196922

[51] Int. Cl.⁴ .................................... H02K 41/00
[52] U.S. Cl. ......................... 310/12; 318/135
[58] Field of Search .................. 310/12–19; 308/135

[56] References Cited

U.S. PATENT DOCUMENTS

| 2,993,130 | 7/1961 | Laithwaite | 310/13 |
| 4,037,122 | 7/1977 | Bonner | 310/126 |
| 4,149,808 | 4/1979 | Matthias | 310/126 |

*Primary Examiner*—Donovan F. Duggan
*Attorney, Agent, or Firm*—Fitzpatrick, Cella, Harper & Scinto

[57] ABSTRACT

A linear motor comprises a stator of a magnetic material, a movable element of a magnetic material movable along the stator and support means for supporting the movable element to hold a magnetic force of attraction to the stator. The movable element is arranged at a position displaced from the stator in a normal direction to a direction of movement of the movable means.

8 Claims, 6 Drawing Figures

LINEAR MOTOR

This application is a continuation of application Ser. No. 550,017 filed Nov. 8, 1983, now abandoned.

BACKGROUND OF THE INVENTION

1. Field of the Invention

The present invention relates to a linear motor having a movable element linearly movable along a stator.

2. Description of the Prior Art

A prior art linear motor used in a printer or the like is shown in FIG. 1.

A movable element 2 is arranged to face a stator 1; and a yoke 3 of the movable element 2 is attracted to the stator 1. The stator 1 has grooves formed at a predetermined pitch in a plate made of a magnetic material, as shown in FIG. 2. FIG. 3 shows a sectional view taken along a line III—III of FIG. 1. The movable element 2 stably stops at the position shown by a magnetic force of attraction of a permanent magnet 4 of the movable element 2. Numeral 7 shows a magnetic loop created. The pitch of the teeth of the yoke 3 and the pitch of the teeth of the stator 1 are different from each other. The movable element 2 is moved stepwise to the right or left by selectively energizing coils 5 and 6 wound on the yoke 3. In FIG. 1, numeral 8 denotes a roller rotatably supported on the movable element by a shaft 9. The roller 8 contacts a surface of the stator to maintain a constant gap between the movable element and the stator 1. Numeral 10 denotes a support plate affixed to the movable element 2. The support plate 10 holds adjusting tables 11 in union therewith by bolts 12. Rollers 13 are rotatably supported on the adjusting tables 11 by shafts 14. The rollers 13 hold the opposite sides of the stator 1 and guide the movable element 2 to prevent the movable element from shifting in a direction shown by the arrow B, which is substantially normal to the direction of movement of the movable element 2 and parallel to the opposing surfaces of the movable element 2 and the stator 1. In such a prior art linear motor, the pair of rollers 13 are required to reduce play of the movable element 2 in the direction of the arrow B; and those rollers must be finely adjusted so that they exactly hold the stator 1. The assembly work is hard and it results in high cost. Further, because of the structure of moving the movable element 2, while the stator 1 is guided between the rollers 13, if the stator width varies slightly, the load of the movable element 2 varies, and it is difficult to move the movable element 2 at a uniform speed.

SUMMARY OF THE INVENTION

It is an object of the present invention to provide an inexpensive linear motor which is simple in construction and does not need adjustment.

It is another object of the present invention to provide its linear motor having a stable movement of its movable element.

It is another object of the present invention to provide a linear motor having a movable element linearly movable along a stator, in which a magnetic force of attraction is imparted between a stator and a movable element in parallel to a plane facing the stator and the movable element and substantially normal to the direction of movement of the movable element so that play in the normal direction is reduced.

Other objects of the present invention will be apparent from the following detailed description of the preferred embodiments of the present invention.

DETAILED DESCRIPTION OF THE PREFERRED EMBODIMENT

Figure 4:
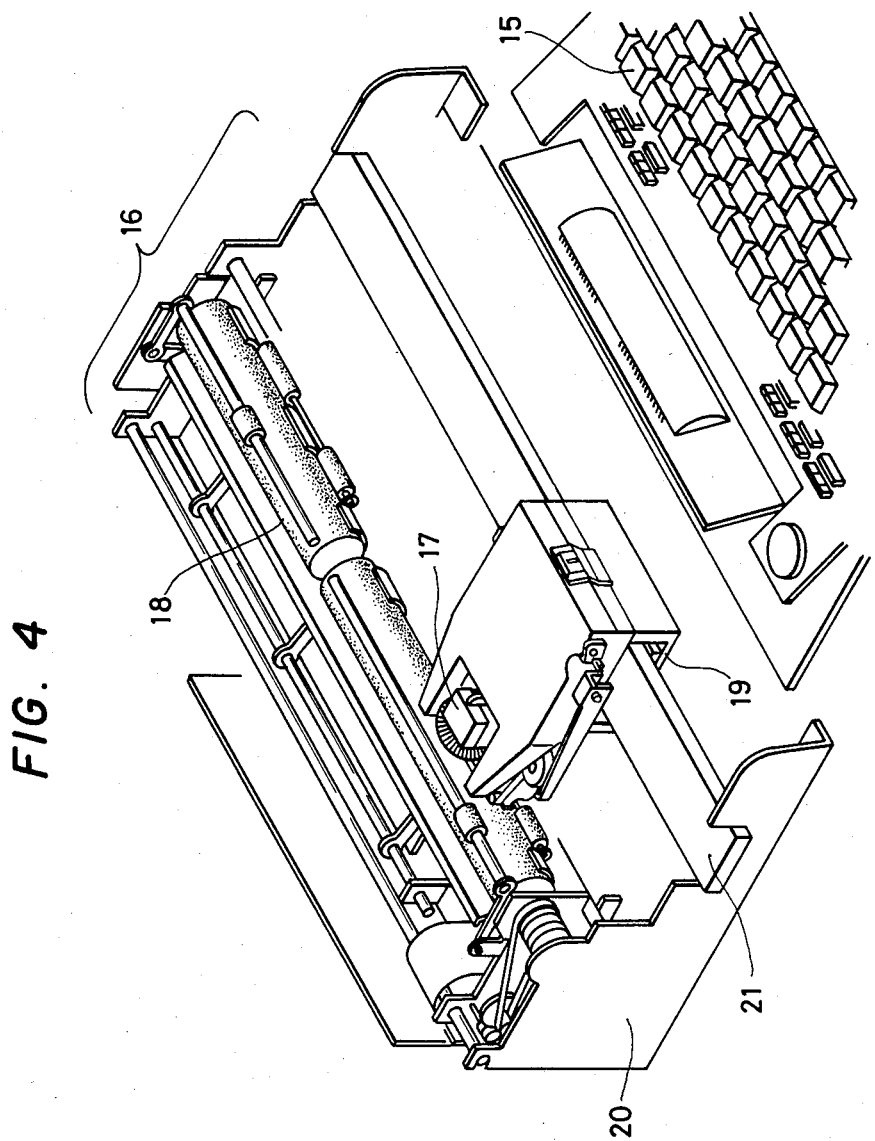
FIG. 4 is a perspective view of a major portion of a typewriter which incorporates an embodiment of a linear motor of the present invention.
Figure 5:
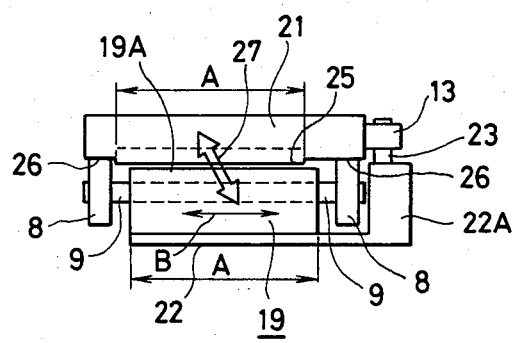
FIG. 5 is a side elevational view of the linear motor of FIG. 4.
Figure 6:
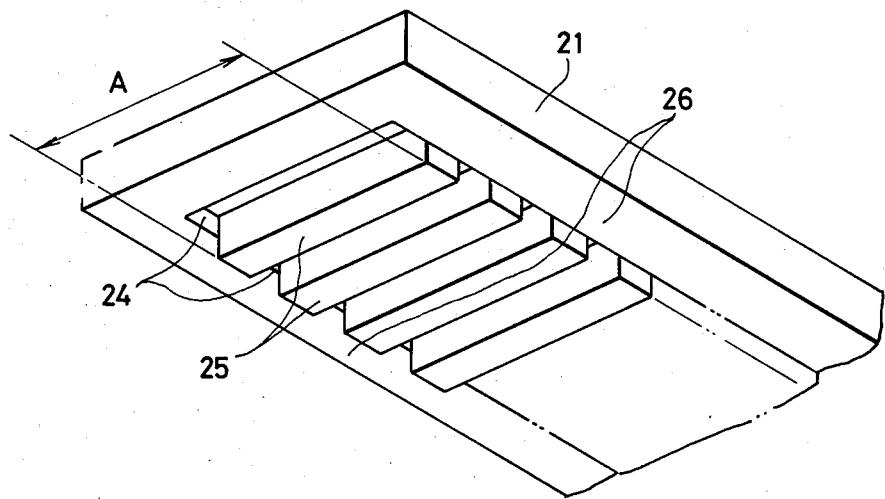
FIG. 6 is a perspective view of a stator of the linear motor of FIG. 5.

FIG. 4 shows a typewriter which incorporates a linear motor in accordance with one embodiment of the present invention. Numeral 15 denotes an input keyboard. Data entered via the keyboard 15 is printed out by a print unit 16. Numeral 17 denotes a print head which comprises a type wheel, an ink ribbon and a hammer. Desired characters are transferred to a print paper (not shown) on a platen 18 through the ink ribbon. Numeral 19 denotes a movable element of a linear motor on which the print head 17 is mounted. The printhead 17 linearly moves along a stator 21 having opposite ends thereof fixed to a chassis 20 of the typewriter. FIG. 5 shows the structure of the linear motor used in the typewriter. The movable element 19 is essentially identical to the moving element 2 described above in connection with FIG. 1. However, the movable element 19 has only one roller 13 which contacts a side of the stator 21. The roller 13 is rotatably supported on a shaft 23 which extends from a base 22A. The base 22A forms part of a support plate 22 which in turn is fixed to the movable element 19. The stator 21 has grooves 24 and projecting teeth 25 alternately arranged at a predetermined pitch as shown in FIG. 6, and a width of each of the projecting teeth 25 is equal to a width of a yoke 19A of the movable element 19. Rollers 8 contact a planar portion 26 on the opposite sides of the projecting teeth 25 of the stator 21; and the roller 13 contacts one side of the stator 13. In this position, the yoke 19A of the movable element 19 and the projecting teeth 25 of the stator 21 are shifted in the direction of an arrow B which is parallel to a plane to which the yoke 19A and the projecting teeth 25 face and substantially normal to a direction of movement of the movable element. Also, a magnetic force of attraction acts between the stator 21 and the movable element 19 in the direction of the arrow 27. As a result, the roller 13 of the movable element 19 is always urged to the side of the stator 21 and no play occurs in the direction of the arrow B. Thus, no adjusting work is necessary to mount the roller 13; and the assembly work is significantly simplified. Since the sides of the stator 21 are not held by a pair of rollers as is required in the prior art structure, and since only one of the sides of the movable element is urged by one roller, a load applied to the movable element during its movement is not varied even if the width of the stator 21 varies slightly along its longer side. Accordingly, stable movement of the movable element is attained.

The present invention is not limited to the above embodiment. For example, while a stepping pulse linear motor is shown in the embodiment, the invention may be used in a conventional DC linear motor. Further, while the projecting teeth 25 of the stator 21 and the yoke 19A of the movable element 19 are shifted in the direction of the arrow B so that the roller 13 is always urged to one side of the stator 21 in the above embodiment, it is not always necessary that both are shifted because, when the projecting teeth 25 of the stator 21 and the yoke 19A of the movable element 19 are shifted in the direction of the arrow B, a magnetic force of attraction for cancelling out the shift is necessarily created. In this case, the roller 13 is not always necessary.

Figure 1:
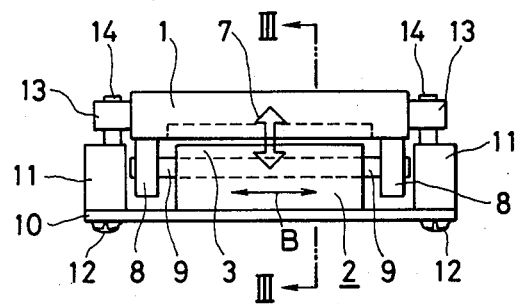
FIG. 1 is a side elevational view of a prior art linear motor.
Figure 2:
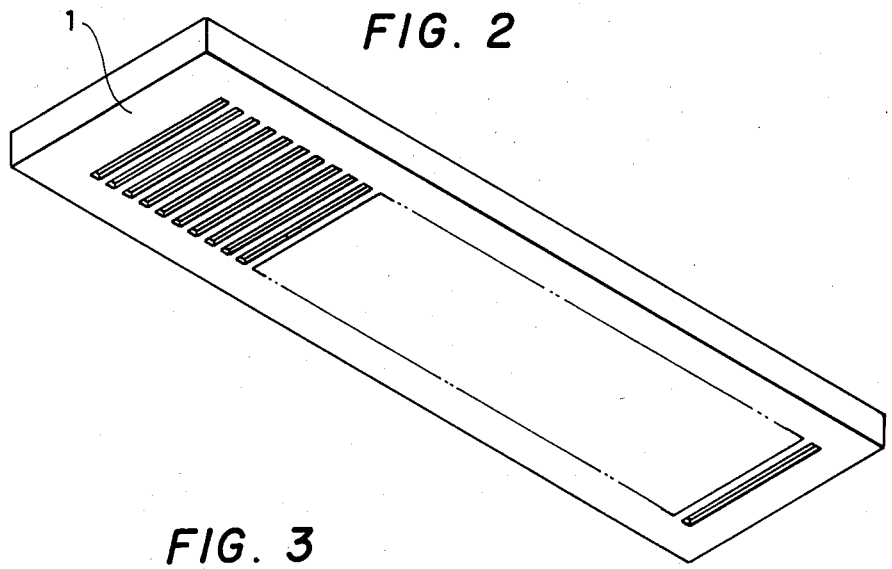
FIG. 2 is a perspective view of a stator of the motor of FIG. 1.
Figure 3:
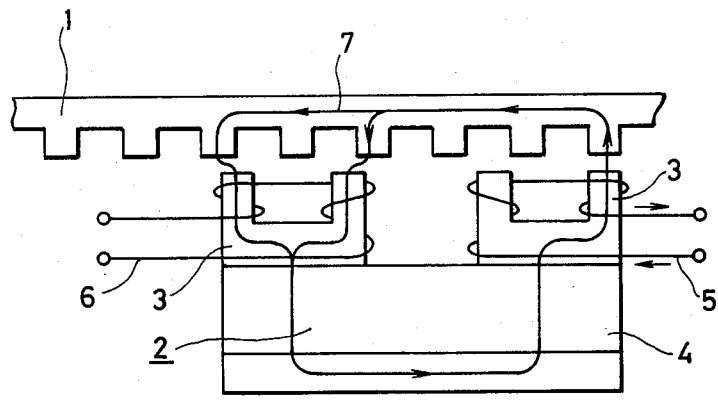
FIG. 3 is a sectional view taken along a line III—III in FIG. 1.

While the above described embodiment includes a stator 21 having the projecting teeth 25 as the yoke, a stator such as shown in FIGS. 1 and 2 having a yoke 3, which is as long as the width of the movable element 19A, may also be used to attain the same effect.

As described hereinabove, the present invention provides a linear motor which is simple in construction and which has no play between the stator and the movable element in the direction of thrust substantially normal to the direction of movement. The present linear motor is very easy to assemble and of low cost. Further, it produces very small load variation on the movable element during its movement.

I claim:

1. A linear motor comprising:
   stator means of a magnetic material;
   movable element means of a magnetic material movable along said stator means, said movable element means having the same width as said stator means and being arranged at a position displaced from said stator means in a direction parallel to the facing planes of the movable element means and the stator means and substantially normal to the direction of movement of said movable means along the stator means; and
   support means for supporting said movable element means at said position displaced from said stator means.

2. A linear motor according to claim 1 wherein said movable element means has a pair of rotary members supported to said movable element means to rotate in contact with a plane facing said stator means such that said movable element means is moved in a spaced relation to said stator means.

3. A linear motor according to claim 1 wherein said support means has at least one rotary member supported to said support means to rotate in contact with a side of said stator means.

4. A linear motor comprising:
   stator means of a magnetic material;
   movable element means movable along said stator means, said movable element means being arranged at a position displaced from said stator means in a direction parallel to the facing planes of the movable element means and the stator means and substantially normal to a direction of movement of said movable element means, said movable element means having a yoke for creating a magnetic force to move said movable element means along said stator means; and
   support means engaged to a side of said stator means for supporting said movable element means at a position displaced in a direction substantially normal to said direction of movement.

5. A linear motor according to claim 4 wherein said movable element means has a pair of rotary members supported to said movable element means to rotate in contact with a plane facing said stator means such that said movable element means is moved in a spaced relation to said stator means.

6. A linear motor according to claim 4 wherein said support means has at least one rotary member supported to said support means to rotate in contact with a side of said stator means.

7. A linear motor comprising:
   stator means of a magnetic material having grooves and projecting portions arranged at a predetermined pitch; and
   movable element means movable along said stator means, said movable element means having a magnetic action area having substantially the same width as said projecting portions of said stator means;
   said movable element means being arranged at a position displaced from said projecting portions in a direction parallel to the facing planes of the movable element means and the stator means and substantially normal to a direction of movement of said movable element means by support means for supporting said movable element means at said position.

8. A linear motor according to claim 7 wherein said support means has at least one rotary member supported to said support means to rotate in contact with a side of said stator means.

* * * * *